(12) United States Patent
Gilmour (10) Patent No.: US 7,882,871 B2
(45) Date of Patent: Feb. 8, 2011

(54) WORK BENCH

(75) Inventor: Mark Andrew Gilmour, Abermain (AU)

(73) Assignee: Saf-Tech Pty Ltd, Newcastle, West (AU)

( * ) Notice: Subject to any disclaimer, the term of this patent is extended or adjusted under 35 U.S.C. 154(b) by 0 days.

(21) Appl. No.: 11/720,229

(22) PCT Filed: Aug. 2, 2005

(86) PCT No.: PCT/AU2005/001148

§ 371 (c)(1),
(2), (4) Date: Apr. 24, 2008

(87) PCT Pub. No.: WO2006/056004

PCT Pub. Date: Jun. 1, 2006

(65) Prior Publication Data

US 2008/0202635 A1  Aug. 28, 2008

(30) Foreign Application Priority Data

Nov. 26, 2004  (AU) ............................. 2004906779

(51) Int. Cl.
*B25H 1/00* (2006.01)
(52) U.S. Cl. ..................... 144/286.5; 144/287
(58) Field of Classification Search .............. 144/286.1, 144/268.5, 287; 83/469, 471, 471.2, 471.3, 83/474, 477

See application file for complete search history.

(56) References Cited

U.S. PATENT DOCUMENTS

| 4,523,617 | A | * | 6/1985 | Tiedemann | 144/286.5 |
| 5,337,875 | A | * | 8/1994 | Lee | 193/35 R |
| 5,435,411 | A | * | 7/1995 | Borgatti | 182/181.1 |
| 5,592,981 | A | * | 1/1997 | Derecktor | 144/286.1 |
| 5,836,365 | A | * | 11/1998 | Derecktor | 144/287 |
| 6,179,024 | B1 | * | 1/2001 | Yang | 144/287 |
| 6,240,987 | B1 | * | 6/2001 | Birkeland | 144/286.1 |
| 6,634,631 | B2 | * | 10/2003 | Hebert | 269/45 |
| 6,745,804 | B2 | * | 6/2004 | Welsh et al. | 144/287 |
| 7,210,510 | B2 | * | 5/2007 | Barclay deTolly | 144/286.1 |
| 2001/0022205 | A1 | | 9/2001 | Ayala et al. | |
| 2004/0200545 | A1 | | 10/2004 | Ayala et al. | |

FOREIGN PATENT DOCUMENTS

WO  WO 01/78950  10/2001

* cited by examiner

*Primary Examiner*—Shelley Self
(74) *Attorney, Agent, or Firm*—Ladas & Parry LLP (57) ABSTRACT

A work bench (10) including at least two work piece supports (57), the two supports are positioned at intervals along an elongate member (24) and define a substantially horizontal plane in which a work piece can move, a mounting (20) for a power tool (12), the mounting is affixed to the elongate member and can rotate about an axis that is substantially parallel to the length of the elongate member, a ground engaging member (106) which supports the power tool mounting at a point spaced away from the elongate member and adjustment means for adjusting the effective length of the ground engaging member.

6 Claims, 10 Drawing Sheets

WORK BENCH

TECHNICAL FIELD

This invention relates to improvements in a work bench.

BACKGROUND TO THE INVENTION

Figure 1:
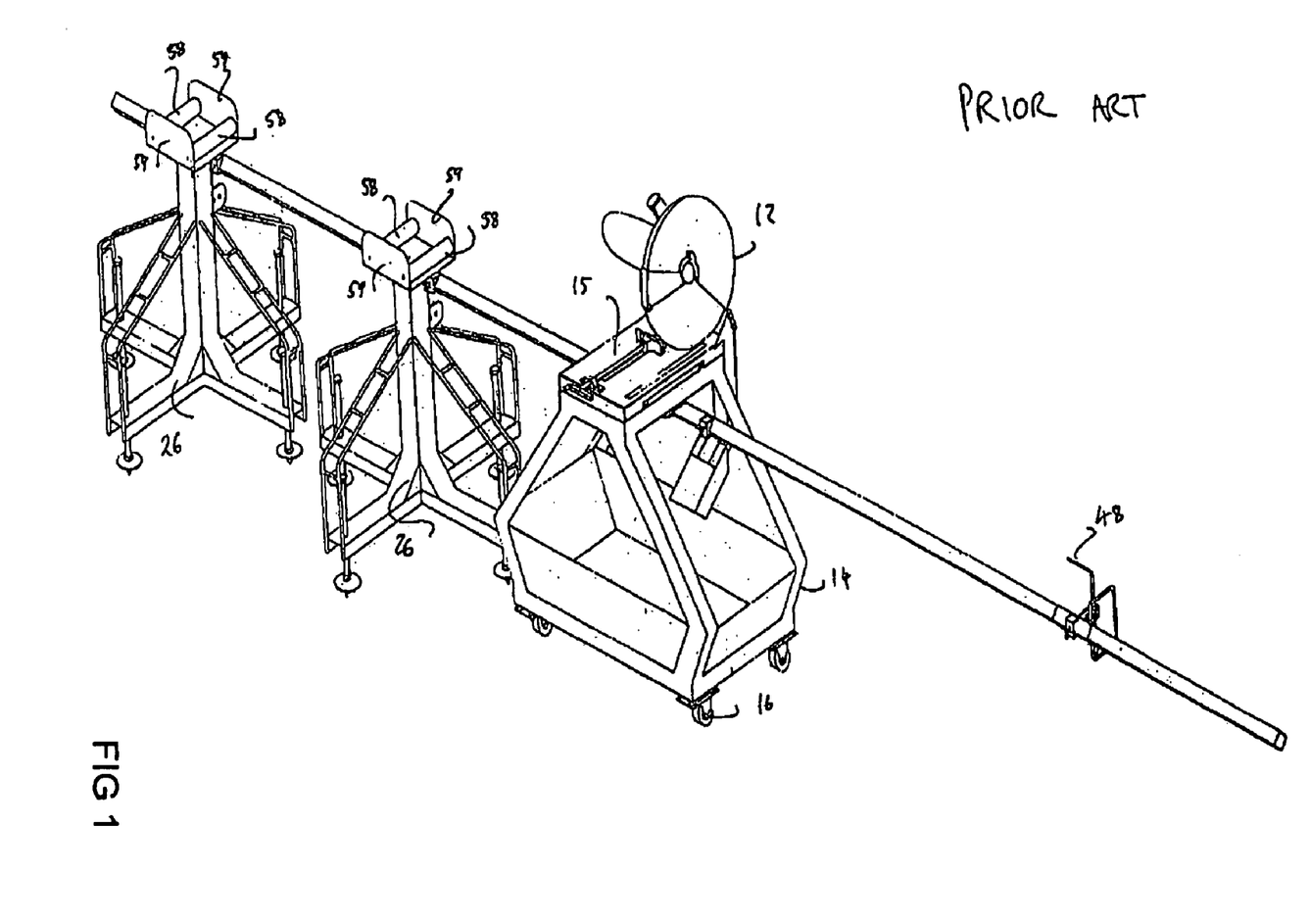
FIG. 1 is a perspective view of a prior art work bench.

A prior art work bench is shown in attached FIG. 1. This work bench is described in published international patent specification WO01/78950, the contents of which are incorporated herein by reference.

In FIG. 1, a power tool in the form of a power saw 12 is mounted to a base structure 14 which in turn is mounted on four castor wheels 16. Workpiece supports are provided in the form of stands 26 fitted with rollers 58 mounted between roller supports 59. In use, a workpiece (not shown) can be moved along rollers 58. Saw 12 can be rotated to cut across the workpiece at a desired angle by rotating base structure 14 on its wheels 16.

End stop 48 can be used to locate the workpiece with respect to the saw to repetitively cut lengths of material to the same length. This is achieved by abutting the end of the workpiece against the end stop 48.

SUMMARY OF THE INVENTION

In a first aspect the present invention provides a work bench including: at least two workpiece supports, the two supports are positioned at intervals along an elongate member and define a substantially horizontal plane in which a workpiece can move; a mounting for a power tool, the mounting is affixed to the elongate member and can rotate about an axis that is substantially parallel to the length of the elongate member; a ground engaging member which supports the power tool mounting at a point spaced away from the elongate member; and adjustment means for adjusting the effective length of the ground engaging member.

By use of the above arrangement, the length of the leg can be adjusted to provide adjustment of the rotational position of the power tool mounting with respect to the elongate member. This allows the position of the power tool to be adjusted so that the base of the tool can be brought into a plane that is substantially parallel to the plane of the underside of the workpiece. This aids the accuracy of machining of the workpiece when using the bench. In the prior art bench of FIG. 1, it had been found that, when used on uneven ground, the orientation of the plane in which bed of power saw 12 lies could change as the saw was rotated.

The workpiece supports may include rollers.

The elongate member may be in the form of a staff.

The mounting may be affixed to the elongate member by receiving the elongate member in a channel.

The mounting may rotate about the elongate member due to elastic deformation of the elongate member.

The adjustment means may include a clamp that can clamp the ground engaging member at a desired position.

In a second aspect the present invention provides a work bench including: at least two workpiece supports, the supports are spaced apart and define a substantially horizontal plane in which a workpiece can move; a mounting for a power tool; an adjustable end stop spaced away from the power tool mounting; and two adjustable side stops are provided proximate to the end stop and are arranged to abut either side of a workpiece to locate the workpiece with respect to the end stop.

In this arrangement, the side stops guide the workpiece to correctly abut the end stop. The operator does not need to walk along to the end stop to inspect whether alignment is correct thus saving time and effort.

The workpiece supports may include rollers.

The workpiece supports may be spaced apart along an elongate member.

The side stops may include threaded portions to allow for adjustment.

The side stops may include locknuts to maintain the side stops in a desired position.

In a third aspect, the present invention provides a workpiece support including: a roller and at least two roller supports; the roller can be mounted in the roller supports in upper and lower positions; in the lower position the periphery of the roller lies below the top edge of the roller supports and in use the roller supports operate to guide a workpiece; and in the upper position the periphery of the roller lies above the top edge of the roller supports.

By use of this arrangement, when in the upper position the rollers can support a workpiece that is wider than the distance between roller supports. The prior art work bench of FIG. 1 is limited to conveying workpieces that are narrower than the distance between roller supports.

The roller may be mounted by engaging the spindle of the roller with holes in the roller supports.

The first and second positions may be defined by the positions of holes in the roller supports.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Unless otherwise indicated, all parts referred to in the following description are formed from square hollow section (SHS) steel. The embodiment of a work bench that will now be described has been designed for easy assembly and disassembly. This allows the bench to be disassembled for easy transportation to a desired location such as a building site.

Figure 2:
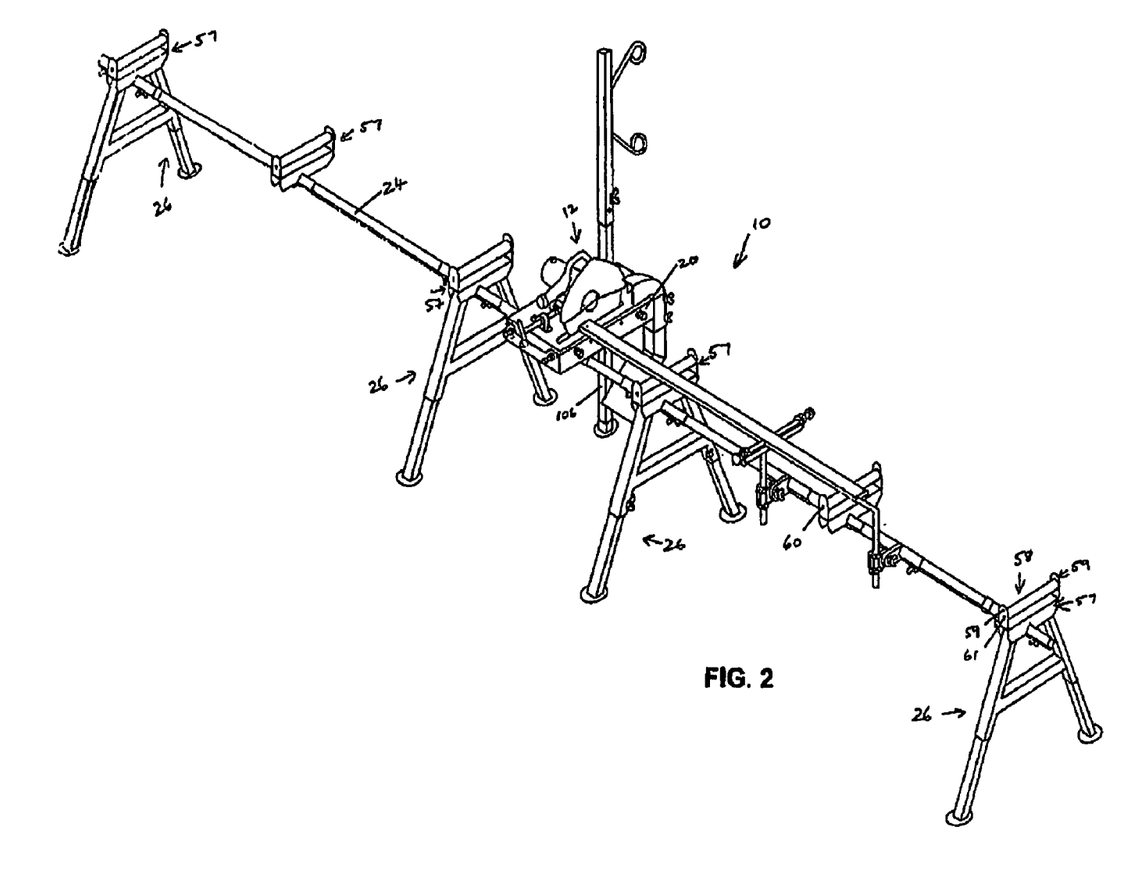
FIG. 2 is a perspective view of a work bench according to an embodiment of the present invention.
Figure 2A:
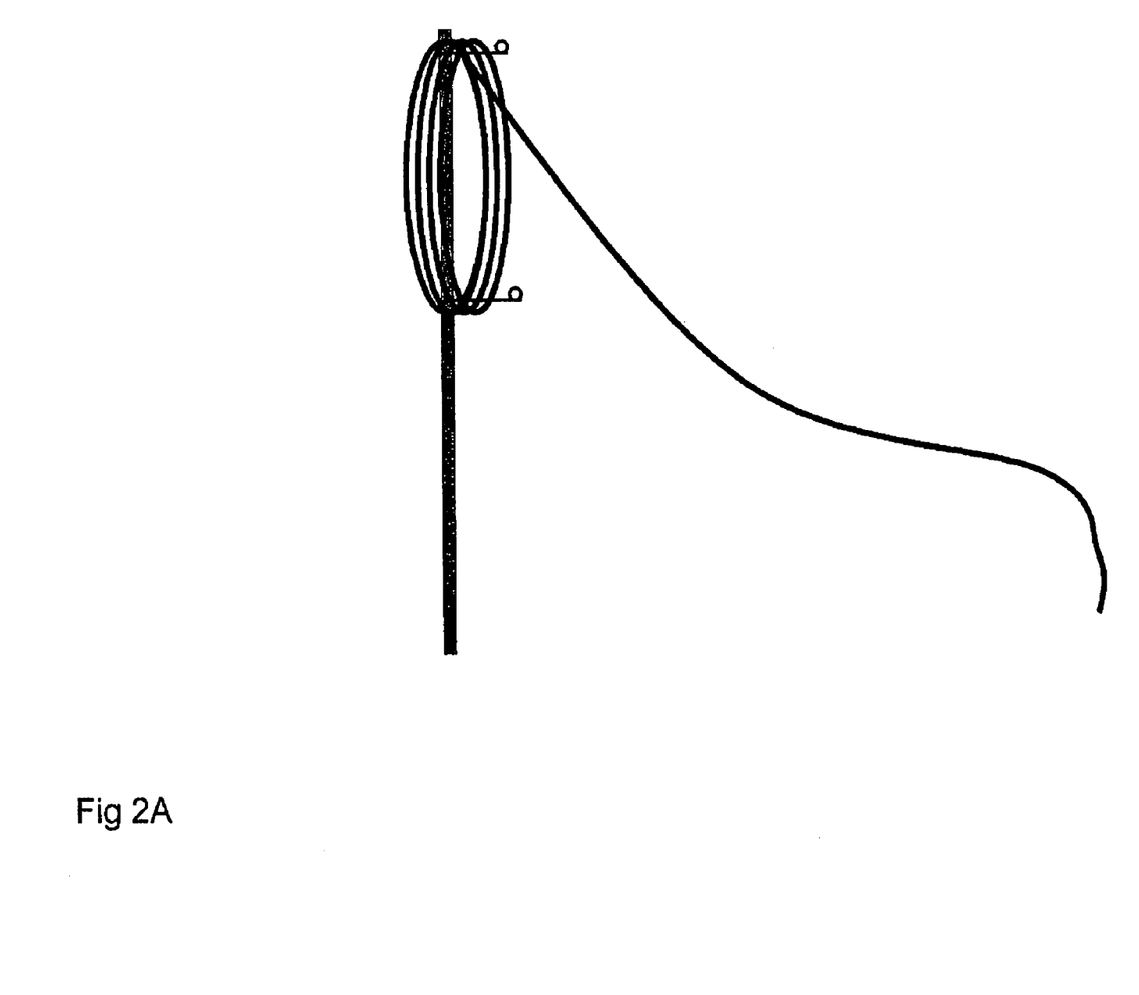
FIGS. 2A, 2B and 2C are detail views of elements of the work bench of FIG. 2.
Figure 3:
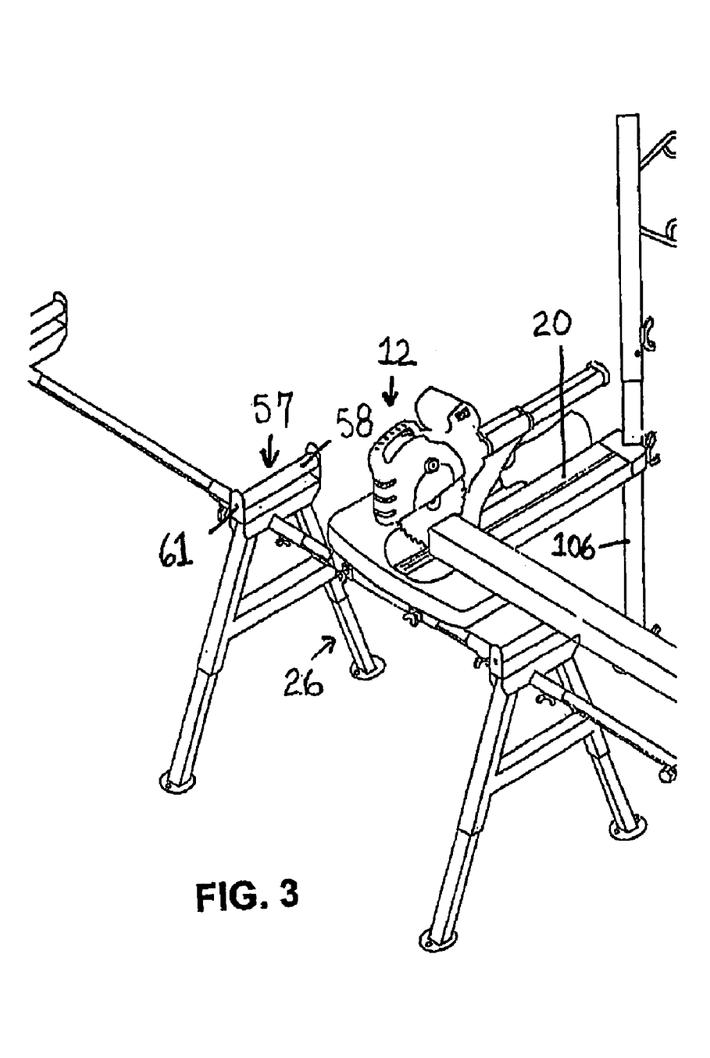
FIG. 3 is an alternative perspective view of the work bench of FIG. 2.
Figure 4:
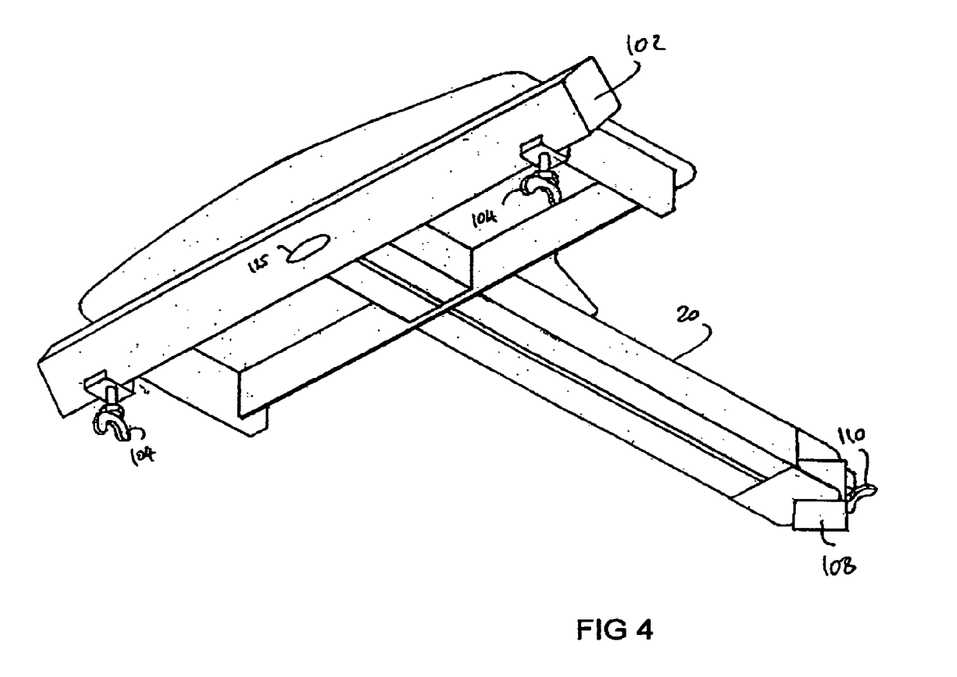
FIG. 4 is an underside perspective view of the power tool mounting of the work bench of FIG. 2.

Referring to FIGS. 2, 3 & 4, a work bench 10 is shown. Work bench 10 includes five workpiece supports in the form of roller assemblies 57. Each roller assembly 57 includes a single roller 58. Each roller 28 rotates about a spindle 61 which engages with holes 60 provided opposite one another in roller supports 59.

Three of the roller assemblies 57 include stands 26 which are positioned at intervals along an elongate member in the form of staff 24. Staff 24 is made up of a number of segments which fit together and to end in a telescopic fashion and can be clamped together at each joint by tightening a wingbolt. Providing the staff 24 in segments allows for the staff to be disassembled to short lengths to facilitate transportation. Each stand includes a channel in the form of a sleeve formed from a length of square hollow section steel that is dimensioned to accommodate staff 24. Each sleeve is located underneath roller assembly 57 which receives staff 24 and clamps to staff 24 by way of a threaded wingbolt. By loosening the wingbolts, the roller assembly can be slid along staff 24 to a desired position. The top edges of rollers 58 define a plane in which a workpiece can be moved along the rollers. In FIG. 2, a workpiece in the form of a plank of wood is shown. The underside of the workpiece lies in the plane defined by the top edges of the rollers 58.

A mounting 20 for a power tool is provided and is affixed to staff 24 by inserting staff 24 through sleeve 102 and tightening wingbolts 104 (see FIG. 4). In the drawings, a power saw 12 is shown affixed to mounting 20. Mounting 20 is tightly clamped to staff 24 and is able to rotate about the axis of the length of staff 24 to a certain degree due to rotational elastic deformation of parts of the bench and in particular by elastic deformation of staff 24. Other parts that may elastically deform to a degree are mounting 20, sleeve 102, and stands 26.

A ground engaging member in the form of leg 106 supports mounting 20 at a point spaced away from staff 24 by being fixed to mounting 20 by insertion into sleeve 108 and tightening wingbolt 110 (see FIG. 4) to clamp leg 106 in position. The effective length of leg 106 can be adjusted by slackening wingbolt 110 and sliding leg 106 with respect to sleeve 108, the wingbolt 110 is retightened at the desired position. This adjustment affects the height of the rear part of mounting 20 and thus provides for adjustment of the rotational position of mounting 20 and hence saw 12 with respect to rollers 58. In this way, the rotational position of saw 12 may be adjusted to bring the bed of saw 12 into a plane that is substantially parallel to the plane in which the workpiece moves. Having the power tool properly aligned with the workpiece assists in achieving accurate machining of the workpiece. This feature is particularly helpful if the work bench is being used on uneven ground.

Figure 5:
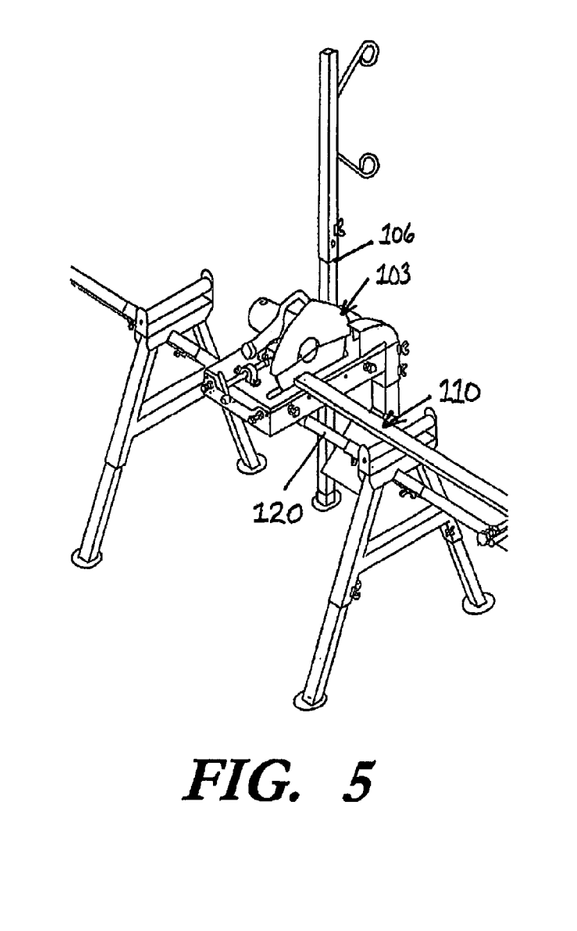
FIG. 5 is a perspective view of a saw bench according to a second embodiment of the present invention.
Figure 6:
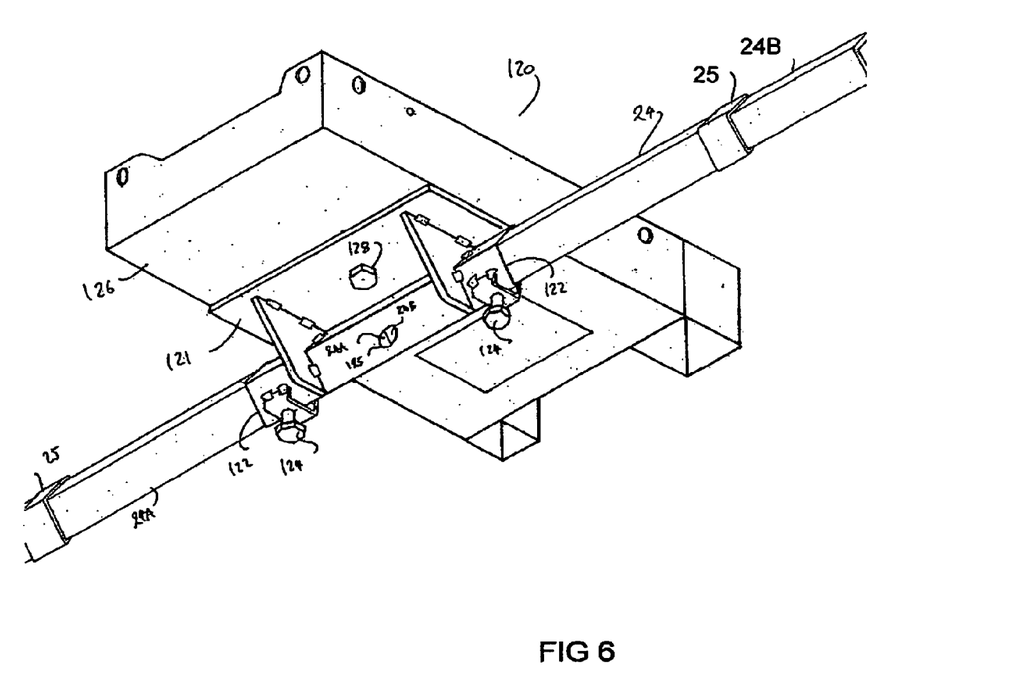
FIG. 6 is an underside perspective view of the power tool mounting of the work bench of FIG. 5.

Referring to FIGS. 5 & 6, an alternative embodiment of a work bench 110 is shown. This embodiment differs from the above described embodiment in that an alternative power tool mounting 120 is provided. Mounting 120 allows for rotation in a horizontal plane as will now be described. Referring to FIG. 6, mounting 120 is made up of two major components being clamp 121 and tray 126. Two segments of staff 24 are shown being segments 24A 24B. Clamp 121 is affixed to staff 24 by inserting staff segments 24A and 24B into sleeve 122. A sight hole 125 is provided to allow an operator to ensure that segments 24A and 24B meet approximately in the middle of sleeve 122. When segments 24A and 24B are in the correct position wing bolts 124 are tightened to retain them in position.

Each of segments 24A and 24B is made up of a length of SHS steel with a depth limiting collar 25 provided near to one end. As an alternative method of assembly, the end with the depth limiting collar 25 can be inserted into sleeve 122. This allows other components to be slid onto the free end of the segment. This also obviates the need for sight hole 125, as the collar 25 dictates the depth of insertion of a segment into channel 122. After one segment has been inserted in this manner, the end of the segment inside channel 121 itself dictates the depth of insertion of another segment into the other end of channel 121.

Tray 126 is attached to clamp 121 by way of a single bolt 128. Thus, tray 126 can rotate with respect to clamp 121 about the axis of bolt 128. In use, a power tool such as saw 12 is mounted to tray 126. This arrangement allows for rotation of the power tool in a horizontal plane. It can be seen in FIG. 5 that the tray has been rotated to the side to achieve an angular cut with saw 130. This feature is particularly useful if the power tool being used does not itself provide for pivotal movement in a horizontal plane. The saw 12 shown in FIGS. 2 & 3 itself provides for this movement by way of rotatable turntable 13.

When dismantling the work bench for transport, the power tool mounting 20, 120 can be left attached to the underside of the power tool. In this way the mounting 20, 120 serves to protect the base of the power tool from accidental damage that might be caused in transit.

Figure 2B:
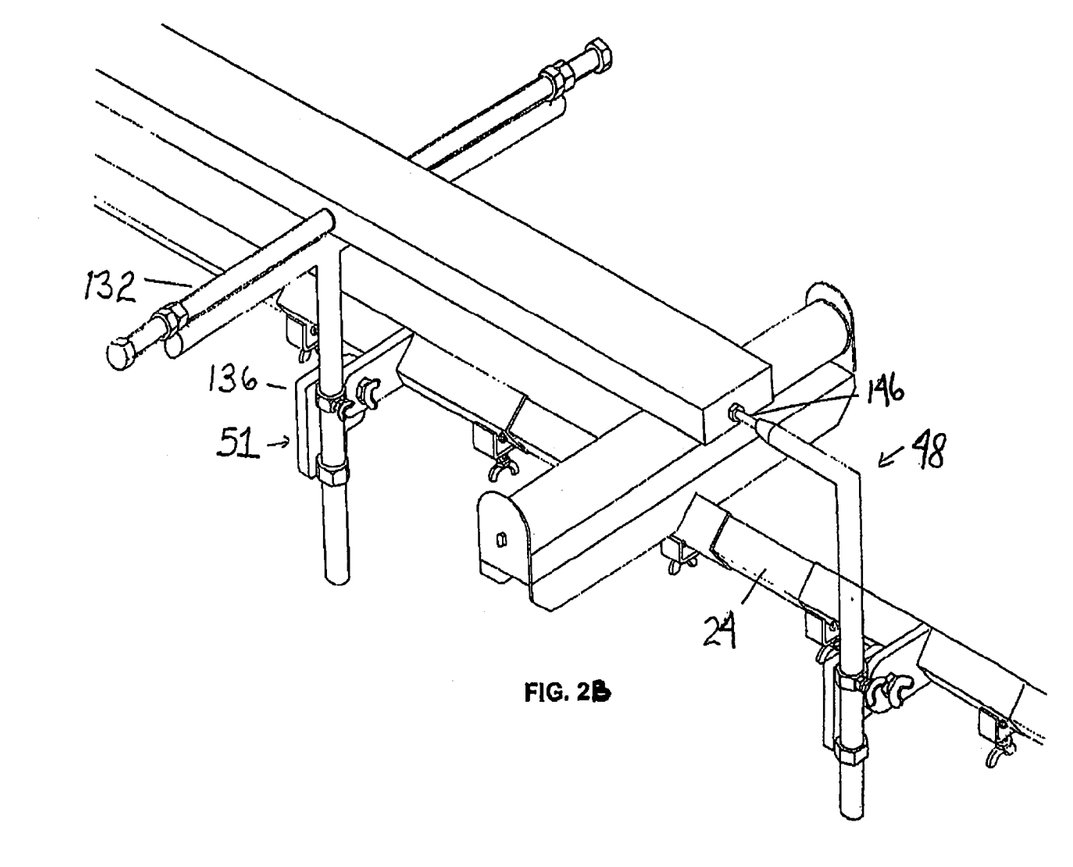
Figure 7:
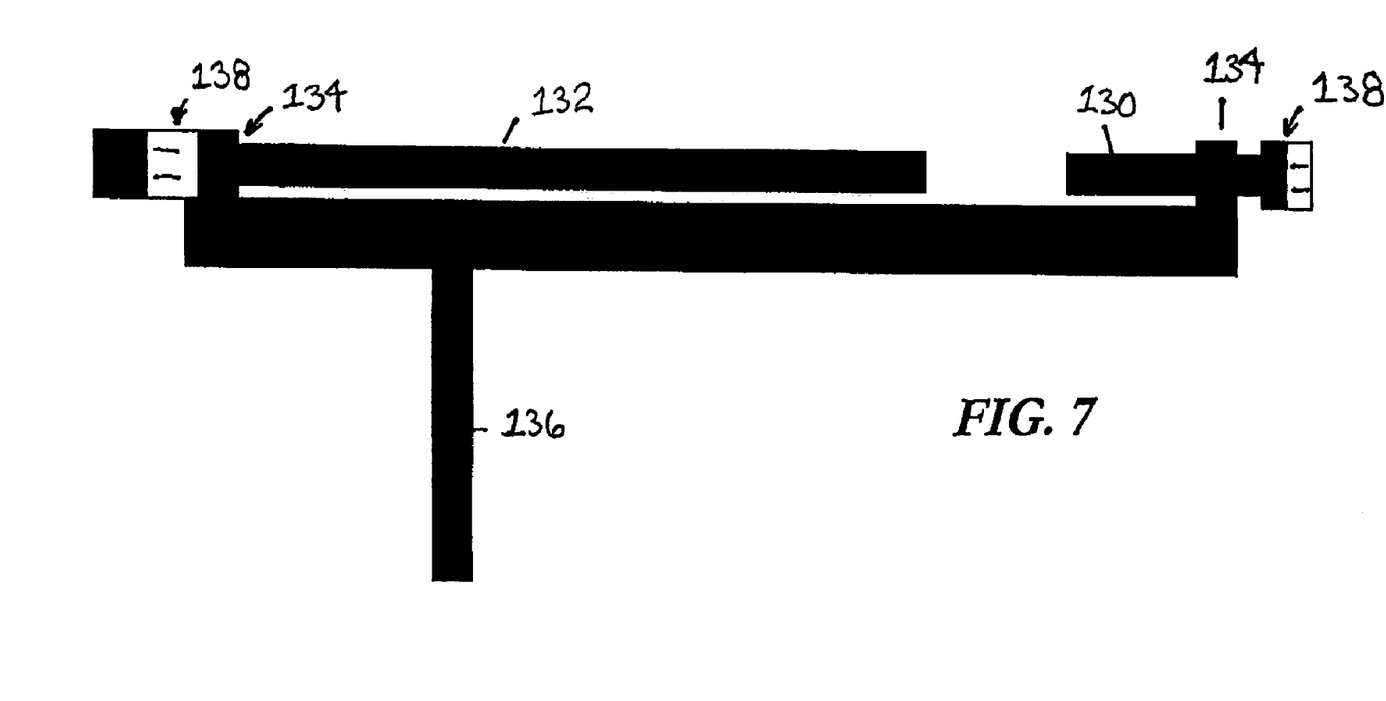
FIG. 7 depicts in detail the adjustable side stops of FIG. 2.

Referring to FIGS. 2, 2B and 7, work bench 10 includes an end stop 48. End stop 48 is held in a pivotal mounting 49. Pivotal mounting 49 includes two main component being a sleeve that fits telescopically about staff 24, and a clamp that holds end stop 48. The sleeve can by slid along staff 24 to any desired position and is secured in place by tightening two wingbolts provided on the clamp with engage with staff 24.

The clamp can pivot with respect to the sleeve. This allows the end stop 48 to be tilted away from the workpiece when necessary. The pivotal assembly pivots in a vertical plane that is perpendicular to the direction of travel of the workpiece. The ability to tilt the end stop away from the workpiece is particularly useful when making the final part of a cut using an abrasive cutting disc as otherwise, the workpiece can become jammed against the end stop with associated risk of damaging the abrasive cutting disc.

A bolt 140 and locknut is provided on the end of end stop 48. This allows fine adjustment of the positioning of workpiece when butted against end stop 48.

Work bench 10 further includes two adjustable side stops in the form of threaded rods 130, 132 which are held in threaded portions 134 of bracket 136 (see FIG. 7). Locknuts 138 are provided to allow side stops 130, 132 to be secured in a desired position. Bracket 136 is fitted to staff 24 by way of clamp 51. Leg 137 of bracket 136 is formed from round bar steel and includes means for aligning bracket with respect to the workpiece in the form of a flat portion (not shown) on the leg 137. The flat portion locates in the clamp which holds bracket 136 to perpendicularly align bracket 136 with respect to the workpiece. Clamp 51 may be loosened and moved along staff 24 to any desired position.

As can be seen in FIG. 2, the side stops 130, 132 are adjusted to abut either side of workpiece (in this case, a plank of wood). The side stops 130, 132 go to ensuring that the workpiece is accurately positioned before cutting.

A roller assembly 57 and roller 58 is provided proximate end stop 48 to support the workpiece. Roller assembly includes a sleeve which receives staff 24 and can be clamped in position with a wingbolt. Thus, the wingbolt can be loosened to allow repositioning of the roller assembly 57 by sliding it along staff 24.

The spindle 61 of each roller 58 is spring loaded. Pressing both ends of the spindle towards one another allows the spindle and roller to be removed from roller supports 59.

Figure 2C:
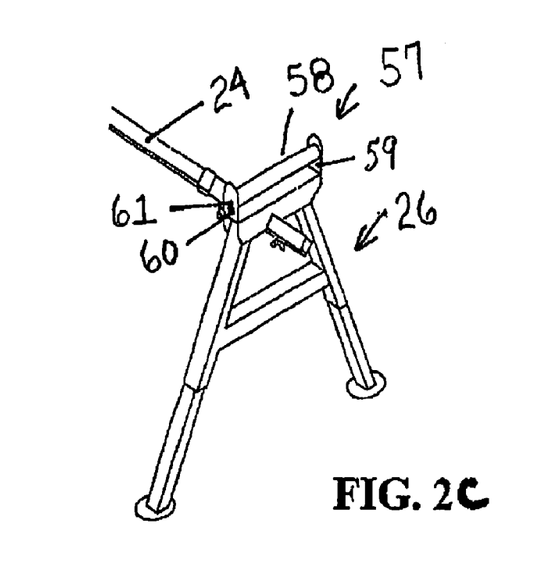

Two pairs of holes 60 are provided on each stand (see FIG. 2C). Each pair of holes defines a position for the spindle 61 of a roller 58. The lower pair of holes defines a lower position for roller 58. The rollers 58 are shown in the lower position in FIG. 2. In this position the periphery of roller 58 lies below the top edge of the roller supports 59 and in use the roller supports 59 operate to guide a workpiece. In the upper position, the periphery of the roller 58 lies above the top edge of the roller supports 59. In the upper position the roller can be used to convey a workpiece that is wider than the roller such as a sheet of material.

Additional pairs of holes 60 may be provided in roller supports 59 to allow mounting of the roller between the upper and lowermost positions. This can be used to adjust the height of rollers 58 to accommodate the operating height of various power tools that might be attached to mounting 20.

In the above described embodiments workpiece supports were provided in the form of rollers 58. Similarly, other suitable supports could be used that allow for movement of a workpiece.

In the above described embodiments adjustment means for adjusting the effective length of leg 106 was provided by allowing sliding movement of leg 106. Other means could be employed such as providing a telescopic portion of the leg, or providing a screw threaded foot on leg 106.

In the above described embodiments the rollers could be moved from an upper to a lower position by using an appropriate pair of holes 60. Other means of moving the rollers could be used such as holding the ends of spindles 61 in adjustable mountings that can be adjusted up or down by travelling on screw threads.

In the above described embodiment, square hollow section steel was used to form staff 24, and square sleeves were provided on associated components to allow them to be fitted to staff 24. Similarly, other steel sections could be used such as a rectangular section. A round section staff with round section sleeves is less desirable, because this arrangement does not provide positive rotational engagement between the staff and the sleeves and so the stability of the work bench may be reduced.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A work bench including:
   at least two workpiece supports, the workpiece supports being positioned at intervals along an elongate member and defining a substantially horizontal plane adapted to allow a workpiece to move therein;
   a mounting for a power tool, the mounting being affixed to the elongate member and rotatable about an axis that is substantially parallel to the length of the elongate member, the mounting extending at an angle from the elongate member;
   a ground engaging member extending downwardly from the mounting from a position spaced away from the elongate member; and
   adjustment means for adjusting the effective length of the ground engaging member.

2. A work bench as defined in claim 1, wherein the workpiece supports include rollers.

3. A work bench as defined in claim 1, wherein the elongate member is in the form of a staff.

4. A work bench as defined in claim 1, wherein the mounting is affixed to the elongate member by receiving the elongate member in a channel.

5. A work bench as defined in claim 1, wherein the mounting rotates about the elongate member due to elastic deformation of the elongate member.

6. A work bench as defined in claim 1, wherein the adjustment means includes a clamp adapted to clamp the ground engaging member at a desired position.

* * * * *